T. W. BOYLE.
Shovel-Plow.

No. 200,819.   Patented March 5, 1878.

Witnesses:
J. J. Masson
D. P. Cowl

Inventor
Thaddeus Walton Boyle
by E. E. Masson
atty.

N. PETERS, PHOTO-LITHOGRAPHER, WASHINGTON, D C.

UNITED STATES PATENT OFFICE.

THADDEUS W. BOYLE, OF AUGUSTA, GEORGIA.

IMPROVEMENT IN SHOVEL-PLOWS.

Specification forming part of Letters Patent No. 200,819, dated March 5, 1878; application filed January 23, 1878.

*To all whom it may concern:*

Be it known that I, THADDEUS WALTON BOYLE, of Augusta, in the county of Richmond and State of Georgia, have invented certain new and useful Improvements in Shovel-Plows; and that the following is a full, clear, and exact description of the same, reference being had to the accompanying drawings, making a part of this specification, in which—

Figure 1:
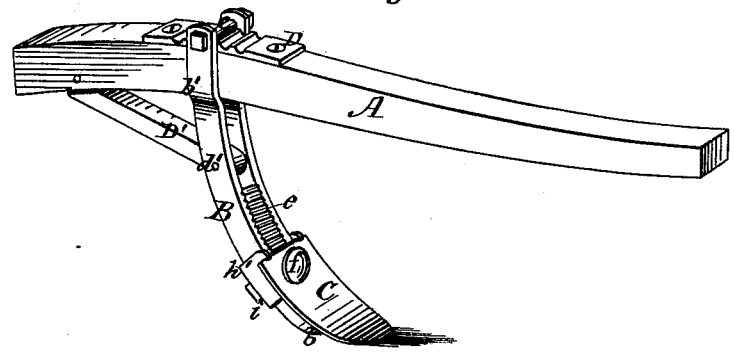
Figure 2:
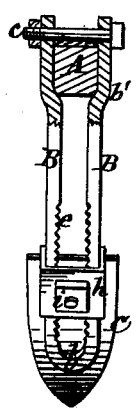
Figure 3:
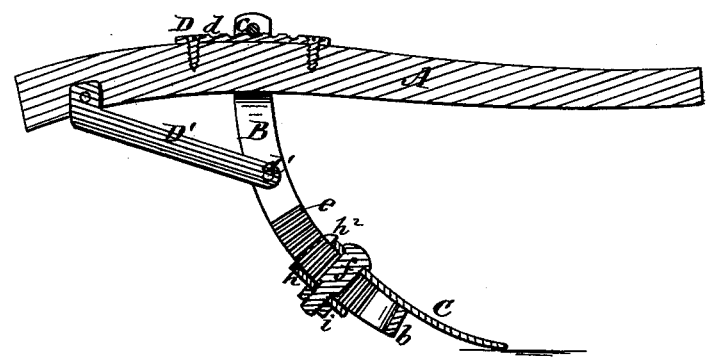
Figure 4:
Figure 5:
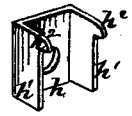
Figure 6:

Figure 1 represents a perspective view of the improved plow. Fig. 2 represents a rear view of the same, partly in section. Fig. 3 represents a longitudinal vertical section of the same. Figs. 4 and 5 represent, respectively, in perspective, the bolt and washer used to fasten the shovel to the standard of the plow. Fig. 6 represents a perspective view of the shovel.

Similar letters of reference denote like parts in all the figures.

My invention relates to shovel-plows or cultivators used in planting corn, cotton, &c., and cultivating the same, in which a beam, either of wood or metal, is used, to which is attached a forked standard that carries the shovel.

My invention consists in a series of teeth or corrugations formed upon the inside faces of the forked standard, in combination with similar corrugations formed longitudinally upon the shank of the bolt passing through the upper part of the shovel, and a washer formed with wings to embrace the forked standard, and projections to rest upon the top of the shovel, and retain the latter securely connected to the standard.

In the accompanying drawings, A represents the plow-beam, and B the forked standard, carrying upon its lower portion the shovel C. This standard is made of a flat bar of metal, bent in the middle, or two flat bars, united at $b$, forming a fork, the ends of which are bent outward at $b'$, so as to fit and embrace the beam. The upper ends of the standard are then united by a bolt, $c$, fitting into grooves $d$, formed transversely across the top of the plow-beam, or in a plate, D, attached on top of said beam, by means of which the angle formed by the standard with the beam can be regulated. The standard is pivoted at $d'$ to a brace, D', attached to the rear of the plow-beam. The pivot $d'$, being riveted to the forked sides of the standard, keeps them from spreading apart at that point. Upon the side of the bar or bars out of which the standard is made a series of teeth or corrugations, $e$, are formed, either while rolling the bar or otherwise, so that after the standard is formed these corrugations are on the inside of one or both of the forked sides of the standard, to engage with similar corrugations formed longitudinally upon the shank of the bolt $f$, passing through the rectangular hole $g$ in the shovel C, and holding the latter in any desired position upon the standard.

Although the bolt $f$ may hold the shovel in position upon the standard in light work, if connected to it by a plain washer and nut, it could not be relied upon for rough or heavy work, as any strain upon either side of the shovel would be liable to turn the bolt, spreading the sides of the standard and loosening the whole fastening. To guard against this I have provided a washer, $h$, having wings $h^1$, projecting at right angles to the face of the washer, to clasp the sides of the standard close to the bolt $f$. The top $h^2$ of these wings projects, when in use, over the top of the shovel, near each corner, and retains it, in connection with the bolt $f$ and nut $i$, securely attached to the standard.

The plow-beam is to be provided with handles, clevis, &c., attached to it in the usual manner.

I am aware that plow-standards have been made with corrugations upon the front or rear portion, to retain the shovel in position, and I do not claim standards so corrugated, or corrugations when so located.

Having now fully described my invention, I claim—

1. In combination with a forked plow-standard and a shovel attached to its lower end, the teeth or corrugations $e$, formed upon the inside faces of said standard, and also similar corrugations formed longitudinally upon the shank of the bolt, to retain the shovel upon the standard, in connection with a washer formed with wings $h^1$ and projections $h^2$, substantially as and for the purpose described.

2. In combination with a forked standard having interior corrugations and a shovel-bolt with longitudinal corrugations, the washer $h$, having wings $h^1$ and projections $h^2$, substantially as and for the purpose described.

THADDEUS WALTON BOYLE.

Witnesses:
GEO. W. BROADHURST,
SEBASTIAN C. DARBON.